United States Patent [19]
Vigneron

[11] 3,870,064
[45] Mar. 11, 1975

[54] METHOD FOR MAKING A BRANCH CONNECTION UNDER PRESSURE TO A PIPE AND A SCREWTHREADED BRANCH CONNECTION FOR CARRYING OUT SAID METHOD

[75] Inventor: Pierre Vigneron, Nancy, France

[73] Assignee: Pont-A-Mousson S. A., Pont-A-Mousson, France

[22] Filed: Mar. 2, 1973

[21] Appl. No.: 337,501

[30] Foreign Application Priority Data
Mar. 31, 1972 France .......................... 72.11645

[52] U.S. Cl. ............... 137/15, 137/318, 285/147
[51] Int. Cl. .................. B23b 41/08, F16e 41/04
[58] Field of Search ............ 137/315, 15, 317, 318; 285/189, 197; 29/157.1

[56] References Cited
UNITED STATES PATENTS
3,349,792  10/1967  Larkin .............................. 137/318
3,822,718  7/1974  Peterson .......................... 137/317

*Primary Examiner*—Martin P. Schwadron
*Assistant Examiner*—David R. Matthews
*Attorney, Agent, or Firm*—Sughrue, Rothwell, Mion, Zinn & Macpeak

[57] ABSTRACT

For achieving a branch connection to a pipe under pressure by means of a screwthreaded connector provided with a sealing device interposed between a radially projecting member on the connector and the pipe, there is produced a fluidtight enclosure having an aperture whose contour is connected in the fluidtight manner to the region of the pipe in which the branch connection is to be made. The sealing device is applied against the pipe before producing the enclosure so that the contour of the aperture of the enclosure is connected to the pipe through the applied sealing device. A hole is thereafter drilled in the pipe and tapped and the connector screwed in the tapped hole from inside the enclosure.

8 Claims, 5 Drawing Figures

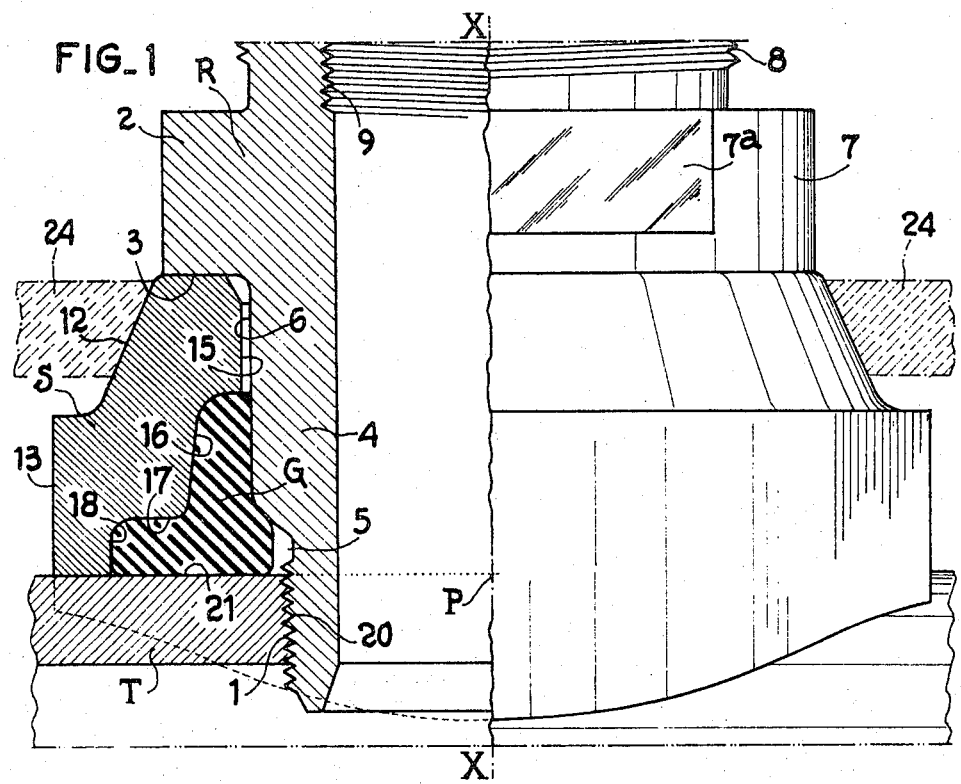
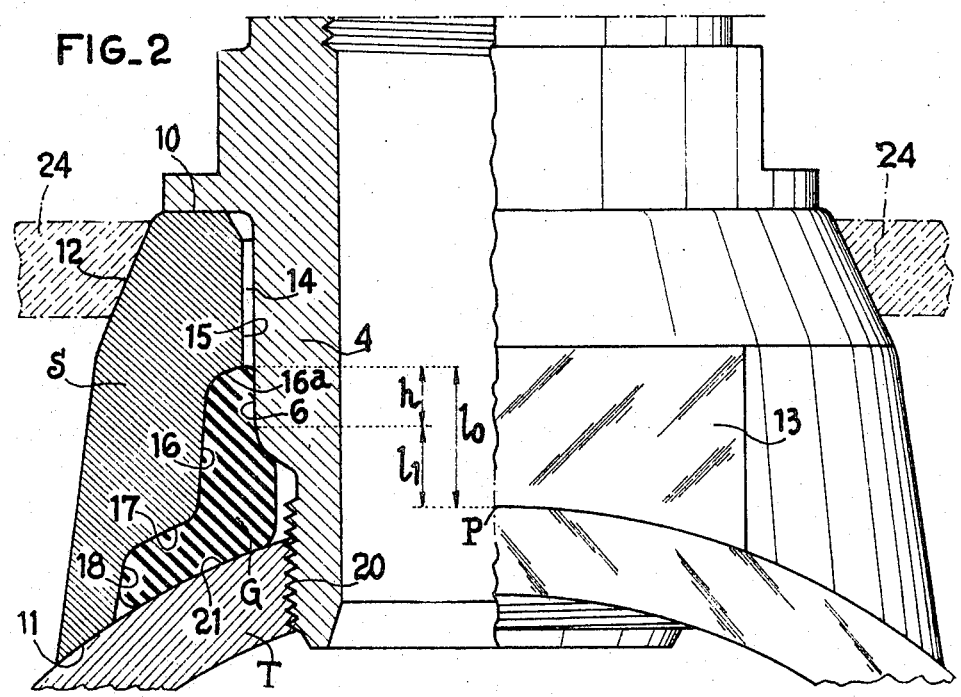

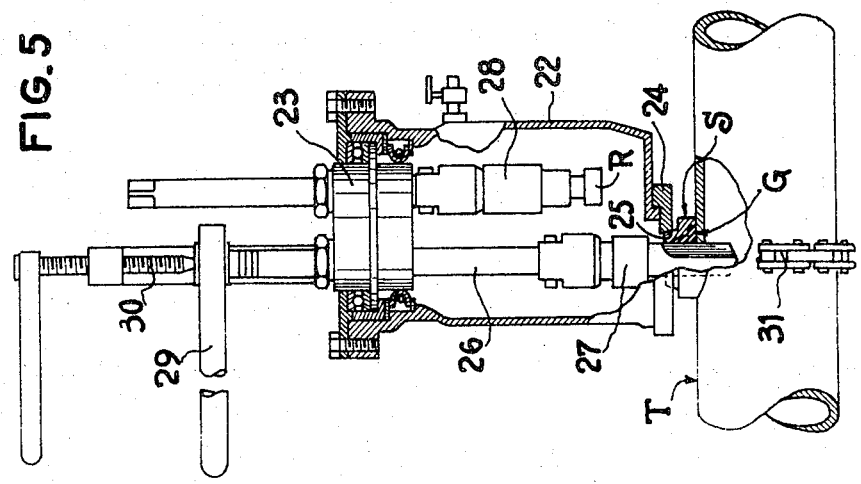
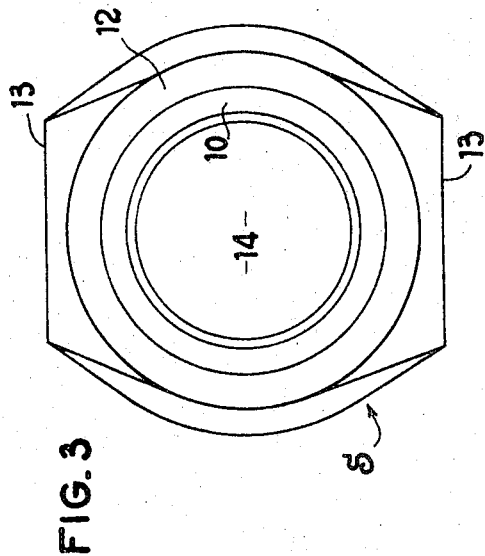

METHOD FOR MAKING A BRANCH CONNECTION UNDER PRESSURE TO A PIPE AND A SCREWTHREADED BRANCH CONNECTION FOR CARRYING OUT SAID METHOD

The present invention relates to a method for making a branch connection to a pipe, and in particular a metal pipe, under pressure, by means of a connector of the screwthreaded type the sealing of which is not achieved on the screwthread but by interposition of a sealing device, constituted, for example, by a sealing element and a support member, between the pipe and a member disposed in radially projecting relation on the connector. This type of branch connector is suitable in particular in the branch connections to pipes having a thin wall in respect of which the number of screwthreads is insufficient to ensure a good seal by merely employing the screwthread. The invention also relates to screwthreaded branch connections for carrying out said method.

A method of this type is known in which there is produced a fluidtight enclosure defining an aperture the contour of which is applied around the region of the pipe in which the branch connection is to be made, then, from inside the enclosure a tapped hole is formed in the pipe, the sealing device is disposed on the pipe around this hole and the connector is screwed into this hole through the sealing device until its flange is tightened against the sealing device. For example, there is employed for this purpose a machine comprising a fluidtight chamber provided with a bearing plate having an aperture in front of which may be brought in succession a drilling and tapping tool and a head for supporting and applying a connector and a sealing device, said tool and said head being disposed inside the box and the machine having a set of interchangeable bearing plates the shapes of which are adapted to the different dimensions of the pipes. The utilisation of this machine for carrying out the known method comprises fixing a connector and a sealing device on its head, directly applying its bearing plate against the pipe, this plate being chosen in such manner that its aperture is capable of allowing through the sealing device, drilling and tapping the hole, disposing the sealing device around the tapped hole, and screwing the connector in the latter by means of the tool and head of the machine and finally detaching the machine from the pipe.

Such a method has the following drawbacks among others :

The sealing device is mounted after the drilling and tapping so that cuttings are trapped between this device and the pipe, which adversely affects the perfect sealing of the branch connection.

As the connector and sealing device are positioned from inside the box, this positioning is of very low precision and the branch connection is not always made exactly in the desired place.

As the box is sealed to the pipe over a relatively large area, the sealing is imperfect and leakages may occur in the course of the mounting, which is particularly disadvantageous when the branch connection is made on a gas pipe or conduit.

As the sealing device is mounted from inside the box, its orientation may be unprecise and its sealing effect imperfect which results in leakages around the branch connection when the latter is finally in position.

An object of the present invention is to overcome these drawbacks.

The invention provides a method comprising producing a fluidtight enclosure having an aperture whose contour is connected in a fluidtight manner to the region of the pipe in which the branch connection is to be made, and drilling and tapping a hole in the pipe and screwing the connector in the tapped hole from inside the enclosure, the sealing device being applied against the pipe before the connector is screwed in position, wherein the sealing device is applied against the pipe around said region before producing the enclosure and the enclosure is then produced so that the contour of its aperture is connected to the pipe through the applied sealing device, the drilling and tapping and the screwing being thereafter carried out from inside the enclosure.

In the case where a machine of the above-indicated type is employed for this method, the sealing device is applied against the pipe, a connector is mounted on the head of the machine, the machine is applied by its bearing plate against said device and the hole is drilled and tapped and the connector is screwed in position through the sealing device before finally detaching the machine.

As the sealing device is mounted before the drilling and tapping, no cuttings can be trapped between this device and the pipe. As the device may be placed in position on the pipe in a very precise manner, the position of the branch-connection is also very precise. The bearing plate of the machine bears on the sealing device in a very small area and the seal of the machine during mounting is improved. Finally, as the sealing device is mounted before applying the machine, it can be perfectly well oriented so that any subsequent leakage in service is avoided.

Another object of the invention is to provide, for carrying out said method, a branch connection to a pipe under pressure, comprising a screwthreaded connector and a sealing device comprising, mounted on said connector, an elastically yieldable annular sealing element and a rigid annular ring interposed between said sealing element and a radial member integral with the connector, wherein the sealing element comprises a sleeve portion and an outer flange disposed at one end of the sleeve portion and the ring has internally a cavity which has two shoulders and freely opens axially through its wider part onto an end face of the ring, the radial thickness in the free state of the sleeve portion of the sealing element being greater than the width of the annular space between the end of the narrowest shoulder and the facing surface of the connector and the axial thickness in the free state of the flange of the sealing element being greater than the axial dimension of the wider shoulder.

Further features and advantages of the invention will be apparent from the ensuing description with reference to the accompanying drawings.

In the drawings :

FIG. 1 is a half-elevational view and half-axial sectional view of a connector according to the invention for carrying out the method according to the invention;

FIG. 2 is a half-elevational and half-axial sectional view of the connector shown in FIG. 1 as viewed from the left;

FIG. 3 is a plan view of the bearing member of the connector shown in FIG. 1;

FIG. 4 is an axial sectional view of a sealing element in the free state for the connector, and FIG. 5 is a diagrammatic view, with parts cut away, of a machine employed in carrying out the method according to the invention, this machine being clamped against the pipe and applying the sealing element tightly against the pipe through the bearing member.

In the embodiment shown in the drawings, a connector R, for example of brass and screwthreaded at one of its ends, is to be connected to a thin-walled metal pipe T (for example of ductile iron) at a previously-chosen point P of the wall of this pipe. This point P is usually situated on the upper generatrix of the pipe or in the neighbourhood thereof and in any case in the upper half of the pipe.

The branch connection to be mounted comprises three parts:

the connector R which is tubular and has a screwthreaded end portion and is provided with an annular flange;

the latter is defined adjacent the screwthread by a plane shoulder perpendicular to its axis; this connector may also be of bronze, steel or aluminium or plastics material;

an iron annular saddle or ring S having two perpendicular planes of symmetry, an upper plane face perpendicular to its two planes of symmetry and an inner cavity defining two steps adapted to house the sealing element mentioned hereinafter;

an annular sealing element G which has an L-shaped cross section (the concavity of the L facing outwardly) and is moulded from rubber or other elastomeric material.

The tubular connector R has the shape of a cylindrical tube having an axis X—X and a screwthreaded end portion 1 and a flange 2 which is defined adjacent the screwthreaded end portion by a plane shoulder 3 perpendicular to the axis X—X. The end portion 1 has an outside diameter smaller than the part 4 of the connector which is located between this end portion and the flange 2 and the main part 4 is connected to the portion 1 by a groove 5, the main part 4 having a strictly cylindrical surface 6. The flange 2 is defined radially by a cylindrical surface 7 which has two parallel flat surfaces 7a. If desired, the surface 7 may be replaced by a polyhedral surface having a hexagon base. The upper part of the connector located above the flange 2 has a screwthreaded portion 8, which permits screwthreadedly engaging a pipe or a take-off tap, and a tapped portion 9 for fixing a plug.

The iron saddle S is a cast ring having two perpendicular planes of symmetry which are moreover those of the sections shown in FIGS. 1 and 2. Externally the saddle has a plane upper surface 10 perpendicular to its planes of symmetry and circular and a concave lower surface 11 which is cylindrical and has a diameter equal to the diameter of the pipe T. The outside diameter of the surface 10 is equal to the diameter of the flange 2 of the connector R. If the surface of this flange were polyhedral having a hexagon base the outside diameter of the surface 10 would be equal to that of the circle inscribing the hexagon. Two flat surfaces 13 define the saddle in the direction perpendicular to its longitudinal plane of symmetry which is parallel to the axis of the pipe T. Its outer surface has a frustoconical portion 12 in the vicinity of the surface 10.

Internally, the saddle S has an axial aperture or cavity 14 whose diameter exceeds the diameter of the cylindrical part 4 of the connector R. This aperture has along its axis three successive parts. The part the most remote from the pipe T is defined by a cylindrical surface 15 whose diameter is slightly greater than the outside diameter of the cylindrical part 4 of the connector R defined by the surface 6. The second part is defined by a frustoconical surface 16 which is divergent in the direction away from the surface 15 toward the pipe T, the mean diameter of the surface 16 being distinctly greater than the diameter of the cylindrical part 4 of the connector R. The chamber thus defined is axially defined by a shoulder 16a located at a distance $l_0$ from the pipe T which is greater than the distance $l_1$ between the pipe and the lower end of the cylindrical part 4 of the connector R. Thus, the surface 6 of the connector R and the surface 16 of the saddle S confront one another over a height $h = l_0 - l_1$ the order of magnitude of which is in the neighbourhood for example of that of the thickness of the connector R in its cylindrical part 4. The third part of the aperture which is the largest and the nearest to the pipe, is defined, axially, by a very divergent frustoconical surface 17 which connects this part to the surface 16 and, radially, by another frustoconical surface 18 which diverges in the same way as the surface 16 towards the pipe T and has roughly the same angle of divergence with a mean diameter larger than that of the surface 16.

The sealing element G is an annular moulded member which is moulded flat from rubber or elastomeric material having a Shore hardness of, for example, 58°.

The sealing element comprises a sleeve portion and an outer flange disposed at one end of the sleeve portion. The sleeve portion has parallel inner and outer surfaces both of which are frustoconical and diverge toward the flange. In the free state before mounting, the outside diameter of the flange is roughly equal to the smaller diameter of the surface 18 of the saddle S and the larger diameter of the outer frustoconical surface of the sleeve portion is very slightly greater than the smaller diameter of the surface 16 of the saddle. Also, in the free state of the sealing element, the inner frustoconical surface 19 of the sleeve portion has a minimum diameter $d$ which is distinctly less than the diameter of the surface 6 but only very slightly less than that of the screwthreaded end portion 1 of the connector R and a maximum diameter D which is slightly greater than the diameter of the surface 6.

In the branch connection, the hooking and sealing functions are separate. The mechanical hooking is achieved by screwing the screwthreaded portion 1 of the connector in the tapped hole 20 formed in the wall of the pipe T. The sealing is achieved by means of the sealing element G which operates in the manner of a sealing element which is crushed in its lower part between the surface 17 of the saddle and the surface 21 of the pipe and in the manner of a sealing element which is radially compressed in its upper part between the surface 16 of the saddle and the surface 6 of the connector. This second sealing element operates in the manner of an automatic seal since the conicity of the surfaces 16 and 17 ensures that the higher the pressure the higher compression of the seal. Further, the saddle S provided with the sealing element G is finally positioned at the exact point P at which the connection must be made. The seal between the pipe and the saddle is ensured by the clamping of the machine employed for mounting the branch connection under pressure onto the pipe.

As shown in FIG. 5, this machine comprises a cylindrical body 22 which is closed in its upper part by a fluidtight rotatable barrel 23 and in its lower part by a detachable plate 24 which has an aperture 25. Inside the body there are disposed a tool holder 26 adapted to receive the drill and tap 27 and a branch connection holder 28 adapted to receive a connector R, the tool holder and the connector holder extending through the barrel 23 in such manner as to be capable of being shifted from outside the machine, the tool holder 26 being shifted by a ratchet wrench 29 and a lead screw 30. This machine is completed by a chain 21 which is fixed to the body 22 and is adapted to be clamped or tightened around the pipe T. The machine is applied to the saddle S by putting the plate 24 in contact with the frustoconical surface 12 of the saddle. A sealing element may be interposed between the plate 24 and the saddle S so as to improve the practical conditions of carrying out the method.

The branch connection described hereinbefore is particularly adapted for a branch connection to a water supply conduit or gas supply conduit under pressure with the aid of a machine for drilling under pressure such as that described hereinbefore. The branch connection is made in the following manner :

The machine is prepared in particular by mounting the drill-tap 27 on the holder 26 and screwing the connector R in the holder 28. The body of the pipe T is ground around the point P at the place where the joint of the branch connection must be made. The sealing element G is placed in position in the cavities 16a–16 and 17–18 of the saddle S and the assembly comprising the saddle and sealing element is placed in the right position for the connection around the point P. The machine is then applied against the saddle S through the plate 24 while centering it on the frustoconical part 12 of the saddle and the machine is clamped in position by means of its chain 21 which is tightened around the pipe T until the saddle is in contact with the pipe T throughout its periphery by its surface 11. In this way, the sealing element G is crushed onto the pipe by compression of its lower flange 32 between the surface 17 of the saddle S and the surface 21 of the pipe T so that the seal is finally achieved between the saddle and the pipe. Thus, no leakage to the exterior is possible when drilling and tapping, in particular in the case of a branch connection to a gas conduit.

The drilling and then the tapping is carried out by means of the drill-tap 27 and the connector R is placed in position on the axis of the tapping by means of the barrel 23. This connector R is screwed until it is completely blocked, this blocking being achieved for example at 10 mAdaN or 100 mAN (Newton vector metre) or 200 J/rd (Joules per radian). During this operation, the saddle S is held in position by action on the flat surfaces 13 while the connector R is rotated by the flat surfaces 7a of its flange 2. This screwing has a double action: on one hand it replaces the tightening effect exerted on the saddle S by the machine in the region of the surface 12, this action being indeed ensured by the connector R by the fact that the shoulder 3 of the flange 2 bears on the plane upper face 10 of the saddle S; on the other hand, the introduction of the connector R in the aperture 14 of the saddle produces, in the region of the confronting surfaces 6 of the connector R and 16 of the saddle S, the required seal between the connector and the saddle by the radial compression of the sleeve portion 33 of the sealing element G between these surfaces. The space between the screwthreaded portion 1 of the connector and the base of the sealing element G and particularly the machined groove 5 on the connector serve to accommodate the flow of material due to the various compressions of the sealing element G.

The machine is then removed by releasing its chain 31 and untightening its connector holder 28, this connector holder being unscrewed, while taking care to hold the connector stationary with a spanner engaged with its flat faces 7a, so as to avoid untightening and adversely affecting the various seals. A stop-cock or a temporary plug is then mounted on the head of the connector R.

The branch connection thus achieved has the following advantages, among others :

It comprises only three parts, namely parts R, S and G.

The seal between the saddle and the pipe is achieved before drilling and tapping the latter. Thus the bearing surface is clean before sealing and the seal is unaffected by cuttings coming from the drilling and tapping. The slight prior grinding of the body of the pipe in the area chosen for the branch connection is in fact made for this purpose.

Moreover, in order to ensure that cuttings do not adversely affect the seal between the connector and the saddle in the region of the surfaces 19 of the sealing element and 6 of the connector which are to come into contact with each other, the drilling and tapping are carried out under dry conditions. Thus cuttings do not adhere to the surface 19 of the sealing element G during drilling. They merely, depending on their weight, drop into the pipe at the moment when the aperture opens into the pipe or are urged higher into the body 22 of the machine under the effect of the pressure prevailing in the pipe. Note that the very enveloping shape of the saddle around the sealing element G in the region of the cavity 17–18 very effectively protects the sealing element from the action of the ground.

The fact that the mounting is carried out with a permanent view of the saddle during the entire operation results in very clean and precise work. Further, the seal between the machine and the saddle is very localized; other devices on the other hand require between the periphery of the machine and the pipe a seal which is in fact unreliable throughout the duration of the operations, which is particularly disadvantageous when the branch connection is to be made on a gas conduit.

The branch connection described hereinbefore has been found to be fluidtight at 15 bars water pressure and trials carried out with compressed air have reached 4 bars. The branch connection can be made with metal pipes which are cemented internally, provided that a suitable tool resistant to the cement (carbide tip) is employed for the drilling operation.

It will be understood that modifications may be made to the described embodiment without departing from the scope of the invention. For example, the flange 2 of the connector R may be replaced by a lock nut screwed on the connector. Likewise, in order to substitute in the machine the connector holder for the tap holder in alignment with the aperture there may be employed, instead of a barrel, the temporary interposition of a closure member, which has the advantage of maintaining the initial working axis.

Having now described my invention what I claim as new and desire to secure by Letters Patent is :

1. A method for making a branch connection of a connector to a pipe under pressure, the connector having a body, a screwthreaded portion and means defining a member projecting radially from the body, comprising applying a sealing device to the pipe in a region of the pipe in which the branch connection is to be made, taking means defining a fluidtight enclosure having a portion defining an aperture, applying the periphery of the aperture against the sealing device, drilling and tapping a hole in the pipe and thereafter screwing the screwthreaded portion of the connector in the tapped hole from inside the enclosure until said projecting member bears against the sealing device.

2. A method for making a branch connection of a connector to a pipe under pressure, the connector having a body, a screwthreaded portion and means defining a member projecting radially from the body, comprising applying a sealing device to the pipe in a region of the pipe in which the branch connection is to be made, taking a machine comprising a fluidtight box, a bearing member defining an aperture and combined with the box, means for bringing in succession a drilling and tapping tool disposed inside the box and a head for supporting and screwing a connector disposed inside the box in alignment with the aperture, connecting the connector to the head, applying the bearing member against the sealing device and urging the bearing member in the direction of the pipe, drilling and tapping a hole in the pipe by means of the tool, thereafter screwing the connector in the tapped hole by means of the head, and detaching the machine from the pipe.

3. A branch connection to a pipe under pressure, comprising a connector having a body, a screwthreaded portion and means defining a radially projecting member integral with the body, a sealing device comprising an elastically yieldable annular sealing element mounted on the body and a rigid annular ring coaxial with the interposed between said sealing element and said radially projecting member and surrounding the body, the sealing element having a sleeve portion and an outer flange disposed at one end of the sleeve portion and the ring having an internal cavity having a first portion defining a first shoulder and a larger second portion defining a second shoulder with the first portion, the ring having an annular end face adjoining said second portion, the radial thickness in the free state of the sleeve portion of the sealing element being greater than the width of the annular space between the first portion of the cavity and the body of the connector and the axial thickness in the free state of the flange of the sealing element being greater than the axial extent of the second portion of the cavity.

4. A branch connection as claimed in claim 3, wherein the sleeve portion of the sealing element is tubular and frustoconical and divergent in the direction of the flange.

5. A branch connection as claimed in claim 3, wherein the radially projecting member has a first bearing surface bearing against the ring and the ring as a second axial bearing surface which is radially outside the first bearing surface.

6. A branch connection as claimed in claim 3, wherein the ring has a portion axially adjacent the cavity and having an axial dimension which is less than the axial extent of a portion of the body between the screwthreaded portion and the radially projecting member.

7. A sealing element for a branch connection made under pressure comprising a sleeve portion and an outer flange disposed at one end of the sleeve portion.

8. A thrust ring for a sealing element for a branch connection made under pressure, the ring having an internal cavity having a first portion defining a first shoulder and a larger second portion defining with the first portion a second shoulder and an annular end face adjoining said second portion.

* * * * *